April 26, 1960

J. O. HARDY 2,934,035

STEERING INDICATOR

Filed Sept. 29, 1958

INVENTOR.
JAMES O. HARDY
BY George Spector

AGENT

2,934,035
STEERING INDICATOR

James O. Hardy, Brooklyn, N.Y.

Application September 29, 1958, Serial No. 763,862

1 Claim. (Cl. 116—31)

This invention relates to a device for indicating to an automobile driver the angular position of the front wheels.

In many situations that occur in the operation of an automobile, it is important and advantageous for the driver to know accurately the angular position of the front wheels and how many turns of the steering wheel is required to bring the front wheels to a desired position. For example when a car has been parked in a position with small clearances between two other parked cars, it would be helpful in maneuvering the car from the curb to know at all times the front wheel positions. In parking a car in a situation where the clearances are tight, knowledge of the front wheel position in relation to the steering wheel position simplifies the task of avoiding contact with the curb and surrounding cars and objects.

The instant invention comprises a device which is mounted on the steering wheel shaft. Movement of the steering wheel is translated into the rotation of an indicator mounted on the dashboard which informs the operator of the front wheel position and the number of turns of the steering wheel required to bring the wheels to a position parallel to the longitudinal axis of the car.

Consequently the primary object of this invention is to provide a car with an indicating device which informs the operator of the angular position of the front wheels relative to the rotational position of the steering wheel.

An additional object of this invention is an indicating device mounted on the dashboard which is responsive to the rotation of the steering to indicate the position of the steering wheel and the corresponding angular position of the front wheels.

Additional inventive objects and novel features of this invention will be described in more detail by the following disclosure, claim and attached drawings:

Figure 2:
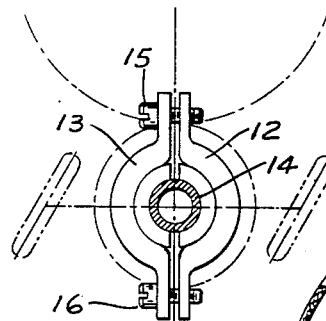
Figure 2 is a section thru plane 2—2 of Figure 1 showing the method of mounting the device on the shaft of the steering wheel.
Figure 1:
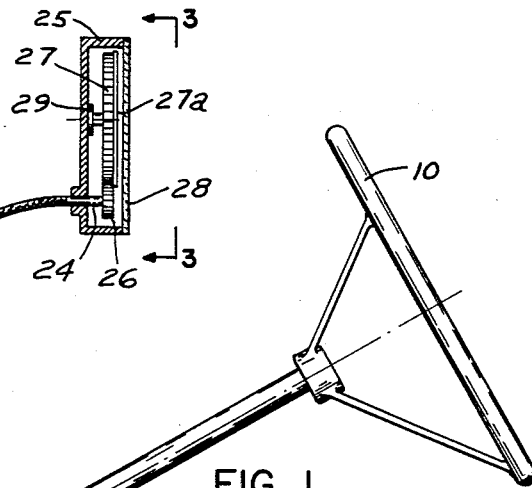
Figure 1 is a side elevation of a steering wheel showing the attached indicator.
Figure 3:
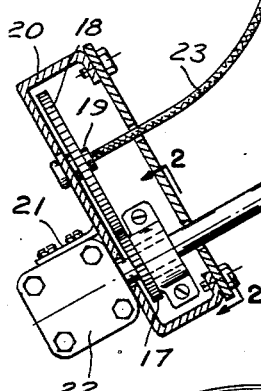
Figure 3 is an elevation of the indicator as seen from plane 3—3 of Figure 1.
Figure 3:
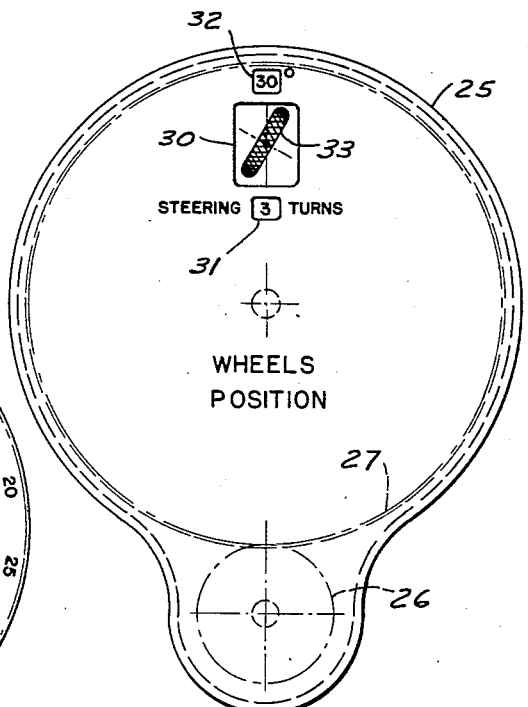
Figure 4:
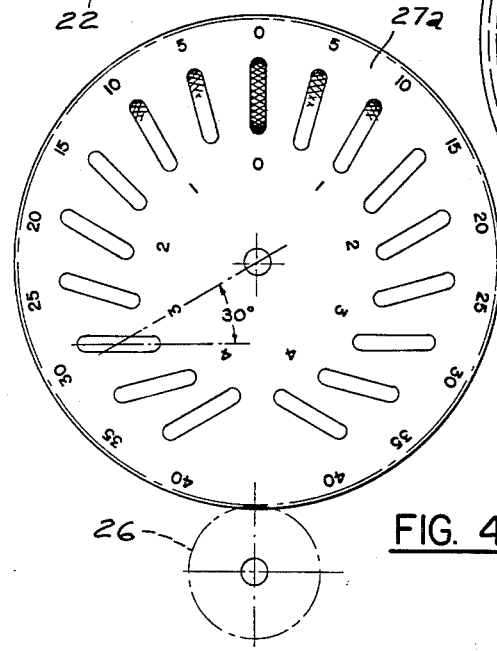
Figure 4 is an enlarged front elevation of the indicator disc.

Referring to the drawings, the novel device is used in connection with a vehicular steering wheel 10 that operates a shaft 11. A pair of clamps 12 and 13 are used to fixedly mount a gear about shaft 11. A resilient gromet 14 is fitted between the clamps and the split cylindrical shanks of a split gear 17. That is the gear 17 comprises two symmetrical halves which are clamped about the shaft 11 by the clamps 12 and 13 with screws 15 and 16 used to effect a tight connection. The gromet 14 prevents slippage and compensates for possible variations in the diameter of shaft 11 according to the model automobile involved. Gear 17 actuates a larger gear 18 having a small axle 19 rotatably mounted in the wall of a housing 20. A bracket 21 is used to affix the housing 20 to the top of the casing 22 that encloses the usual steering shaft gear mechanism. A flexible cable 23 is affixed at one end to axle 19 and at the other end to an axle 24 rotatably mounted in a housing 25 which encloses the indicator assembly. Axle 24 is rigidly connected to small gear 26 which coacts with a larger gear 27 also rotatably mounted in housing 25. The larger gear 27 is provided with an indicator face 27a that is visible through a transparent window 28. The indicator face includes angular calibrations which read from 0° to 45° in both the clockwise and counterclockwise directions corresponding to the angular position of the front wheels of the automobile relative to the longitudinal axis of the automobile. Adjacent each angular calibration a symbol of a wheel is depicted at angle to a radial line from the center of the face equal to the angular position of the front wheels (see Figure 4). Inwardly of each wheel symbol are numerals corresponding to the number of turns that the steering wheel 10 has made relative to its position when the front wheels are parallel to the longitudinal axis of the automobile. For example if the steering wheel had been rotated 3 full turns from zero position, according to the scale shown in Figure 4, the wheels of the vehicle will have moved 30° from zero position. Since the wheel symbol at 30° and 3 steering wheel turns in Figure 4 is at a 30° angle to a radial line, the said wheel symbol will appear at a 30° angle to the radial line passing through 0° when the face 27a has been revolved to cause the 30° radial line to be coincident with the 0° position. Thus in addition to a reading of 30°, 3 turns, the operator is given a visual aid by the appearance of the wheel symbol cocked at 30°. In Figure 3, it is seen more clearly how the operator is informed of this information. The angle made by the wheels appears through an outer aperture 32, the wheel symbol through a larger opening 30 and the number of turns of the steering wheel through an inner hole 31 made in the face 27a of the indicator. It should be understood that the dimensions of the gears 17, 18, 26 and 27 are proportioned to cause a given movement of the steering wheel to result in the calibrated amount of rotation of the face 27a that corresponds to the front wheel position. These proportions will vary with the particular model car involved. The calibrations indicated herein are merely selected for illustrative purposes.

Housing 25 may be mounted on the dashboard by conventional means such as screws, clamps or suction cups.

In operation, assuming the vehicle had been parked with the indicator reading as in Figure 3, the operator upon examining the indicator is immediately informed that the wheels are cocked at 30° to the right (clockwise) with the steering wheel disposed at 3 turns in the clockwise direction from the zero position. Thus without requiring an inspection of the wheels from the car exterior, the operation knows that he must turn his steering wheel counterclockwise 3 turns to restore the wheel alignment to the zero position. Rotation of the steering wheel causes gear 17 to rotate gear 18, cable 23, gear 26 and finally gear 27. Housings 20 and 25 protect the gears from impacts and dust accumulation.

Having described the nature of the invention in detail, a grant of Letters Patent is requested for the novel features as expressed in the following claim.

I claim:

A device for indicating the relative angular positions of a vehicular steering wheel and the corresponding positions of the front wheels of a vehicle comprising an indicator movable to various positions corresponding to the angular positions of the steering wheel and front wheels in combination with a mechanical linkage between the steering wheel and the indicator whereby movement of the steering wheel causes the linkage to move the indicator to positions corresponding to the front wheel positions, said indicator comprising a housing having a large circular portion having a circular planetary gear mounted therein and a small circular portion with a small coacting gear mounted therein, in further combination with a flexible cable projecting through the housing and axially connected to the second said gears, in still further combination with a third gear operatively connected to the opposite end of the said cable, including a fourth gear coacting with the third said gear mounted fixedly on the steering wheel shaft whereby rotation of the steering wheel causes rotary movement of the first said gear and whereby the said four gears and the cable comprise the said linkage, said first gear including indicia enscribed thereon arranged in a circle about the center of the indicator, each of the indicia being a wheel symbol at varying angles with the radial lines to the indicator center symmetrically disposed and ranging from inclinations of zero degrees to 45 degrees on each side of the indicator center line, said housing having a window through which the indicia are each selectively visible one at a time.

References Cited in the file of this patent
UNITED STATES PATENTS 2,707,451   Brink _____ May 3, 1955